(12) United States Patent
Lau et al.

(10) Patent No.: US 9,148,777 B2
(45) Date of Patent: Sep. 29, 2015

(54) INTER-NETWORK PROFILE REPOSITORY INTERWORKING SYSTEMS AND METHODS

(75) Inventors: Priscilla Lau, Fremont, CA (US); Patricia R. Chang, San Ramon, CA (US); Paula Scharlach, San Ramon, CA (US); Louis Chan-Lizardo, San Ramon, CA (US); Mingxing Li, San Jose, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 787 days.

(21) Appl. No.: 12/643,399

(22) Filed: Dec. 21, 2009

(65) Prior Publication Data

US 2011/0151865 A1    Jun. 23, 2011

(51) Int. Cl.
*H04W 8/20* (2009.01)

(52) U.S. Cl.
CPC ....................................... *H04W 8/20* (2013.01)

(58) Field of Classification Search
CPC .......... H04L 65/1016; H04L 65/1073; H04W 12/12; H04W 12/06
USPC ............................. 455/552, 332.2, 332.3, 333
See application file for complete search history.

(56) References Cited

U.S. PATENT DOCUMENTS

| | | | |
|---|---|---|---|
| 2003/0092441 A1* | 5/2003 | Taha et al. | 455/433 |
| 2006/0291489 A1 | 12/2006 | Naqvi et al. | |
| 2007/0270127 A1* | 11/2007 | Santoro et al. | 455/411 |
| 2007/0280177 A1* | 12/2007 | Uusikartano et al. | 370/338 |
| 2008/0130624 A1* | 6/2008 | Hua et al. | 370/350 |
| 2008/0268877 A1 | 10/2008 | Harris | |
| 2009/0193057 A1 | 7/2009 | Maes | |

FOREIGN PATENT DOCUMENTS

EP    1932384    12/2009

* cited by examiner

*Primary Examiner* — Rafael Pérez-Gutiérrez
*Assistant Examiner* — Joshua Schwartz

(57) ABSTRACT

Exemplary inter-network profile repository interworking systems and methods are disclosed. An exemplary system includes an interface facility that interfaces with a home subscriber server ("HSS") of a long term evolution ("LTE") communications network and a home location register ("HLR") of an alternate communications network, the HSS and the HLR maintaining separate profiles associated with a user device configured to access the LTE communications network and the alternate communications network. The exemplary system further includes a synchronization facility communicatively coupled to the interface facility and that synchronizes profile data associated with the user device across the separate profiles maintained by the HSS and the HLR. Corresponding systems and methods are also disclosed.

23 Claims, 9 Drawing Sheets

INTER-NETWORK PROFILE REPOSITORY INTERWORKING SYSTEMS AND METHODS

BACKGROUND INFORMATION

Wireless communication network technologies continue to advance. For example, wireless communication service providers such as mobile phone service providers are deploying and/or working toward deployment of Long Term Evolution ("LTE") based wireless communication networks ("LTE networks"). These service providers typically operate existing wireless communication networks, such as Code Division Multiple Access ("CDMA") based networks ("CDMA networks") and Global System for Mobile communications ("GSM") based wireless communication networks ("GSM networks"). Accordingly, deployment of a new LTE network will generally be by staged implementation that allows user devices (e.g., mobile phones) to roam between the new LTE network and one or more legacy CDMA and/or GSM networks. After full deployment of a new LTE network, a service provider may continue to allow user devices to roam between the new LTE network and one or more legacy networks to leverage existing resources such as bandwidth, applications, etc.

However, the roaming of a user device between a next generation network such as an LTE network and a legacy network such as a CDMA network or a GSM network presents certain technological challenges. For example, a CDMA network typically employs a Home Location Register ("HLR") as a database in which profile information is stored, and an LTE network typically employs a Home Subscriber Server ("HSS") in which separate profile information is stored. When a user device roams from the LTE network to the CDMA network, the user device registers with the CDMA network and retrieves a profile associated with the user device from the HLR of the CDMA network. However, the information included in the profile stored in the HLR of the CDMA network may differ from the information included in a separate profile for the user device stored in the HSS of the LTE network, which may cause one or more profile-dependent operations performed by the user device and/or profile-dependent services accessed by the user device to differ from the LTE network to the CDMA network. Such differences from across networks may be highly inconvenient (e.g., repeat configuration of profile settings may be required from network to network) and potentially confusing for a user, especially when the user is unaware that the user device has roamed from one network to another. Moreover, the use of disparate profiles for a user device across networks may expose the user of the user device and/or the service provider to fraud.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary inter-network profile repository interworking systems and methods are described herein. The exemplary systems and methods described herein may facilitate interworking of one or more services, features, settings, and/or data across distinct communications networks, including communications networks of distinct and/or different platforms and/or architectures. In certain embodiments, the interworking may include synchronizing profile data across profile repositories of distinct communication networks.

To illustrate, in certain examples described in more detail further below, a user of a user device (e.g., a mobile phone device) may utilize the user device to access a service provided over a communications network such as a Long Term Evolution ("LTE") based communications network ("LTE network"). When the user device is registered with the LTE network, the user may utilize the user device to configure certain settings for the service. For example, the service may include a call forwarding service, and the settings may include call forwarding settings configured by the user for the service. The user-configured call forwarding settings may be stored in a profile within the LTE network and may be used for one or more call forwarding service operations provided by the LTE network. With the exemplary systems and methods described herein, the call forwarding settings in the profile within the LTE network may be automatically propagated to a separate profile associated with the same user device and maintained in another communications network (e.g., an alternate communications network) such that the call forwarding settings in the two separate profiles are synchronized. Accordingly, when the user device roams from the LTE network to the other communications network (e.g., an alternate communications network such as a Code Division Multiple Access ("CDMA") based communications network ("CDMA network") or a Global System for Mobile communication ("GSM") based communications network ("GSM network")) and accesses the call forwarding service from within the other communications network, the same call forwarding settings and service that were accessible from the LTE network may be accessed via the other communications network. Accordingly, the call forwarding service may be seamlessly and consistently accessed by the user device over either of the communications networks without introduction of network-specific settings-based differences.

The above-described example is illustrative only. The exemplary systems and methods described herein may provide for additional and/or alternative interworking of one or more services, features, settings, and/or data across distinct communication networks. Exemplary inter-network profile repository interworking systems and methods will now be described in reference to the accompanying drawings.

Figure 1:
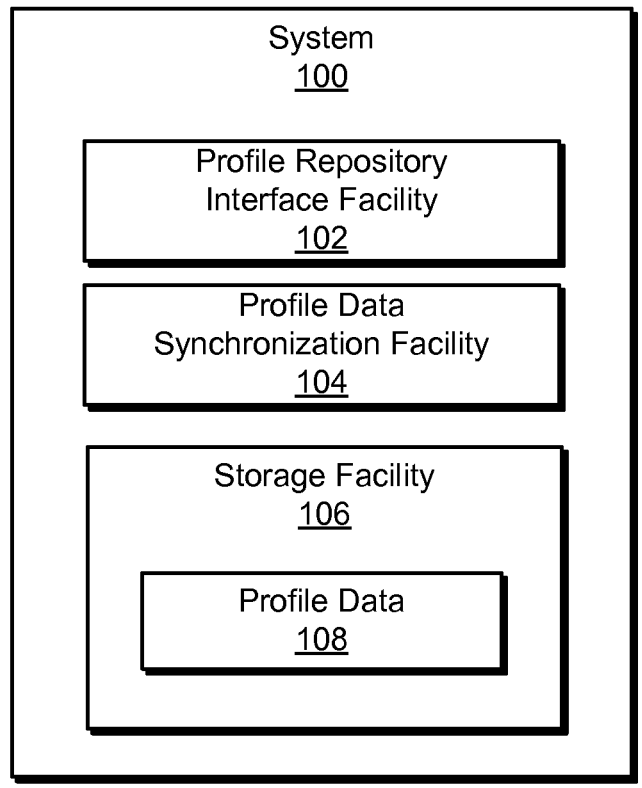
FIG. 1 illustrates an exemplary inter-network profile repository interworking system.

FIG. 1 illustrates an exemplary inter-network profile repository interworking system 100 (or simply "system 100"). As shown, system 100 may include, without limitation, a profile repository interface facility 102 (or simply "interface facility 102"), a profile data synchronization facility 104 (or simply "synchronization facility 104"), and a storage facility 106 selectively and communicatively coupled to one another. Any suitable communication technologies, including any of the communication technologies mentioned herein, may be employed to facilitate communications between facilities 102-106. Each of these facilities will now be described in more detail.

Interface facility 102 may be configured to interface with a plurality of repositories of profile data ("profile repositories") associated with a plurality of communications networks. A profile repository may be specific to a particular communications network. Accordingly, in certain embodiments, each of the distinct communications networks described herein may employ a separate profile repository storing discrete sets of profile data for one or more users of the communications network (e.g., one or more subscribers to one or more services provided over the communications network).

A profile repository may include or be implemented in one or more data storage technologies, databases, data storage media, and/or data storage devices storing profile data. In certain embodiments, for example, a profile repository may include a Home Subscriber Server ("HSS") of an LTE based wireless communications network or a Home Location Register ("HLR") of an alternate wireless communications network such as a CDMA or GSM based wireless communications network.

Profile data maintained by a profile repository of a communications network may include any information related to one or more users (e.g., subscribers), user devices configured to access the communications network, and/or services provided over the communications network. Profile data may be organized into profiles associated with the users and/or user devices. Profile data within a profile associated with a user device may include, without limitation, addressing information (e.g., information useful for establishing and/or sending communications to the user device), location information (e.g., information indicating a geographic location of the user device and/or a network cell location of the user device), registration information indicating one or more "active" networks in which the user device is registered, authorization information, presence information, communication session handling information (e.g., voice and data call handling information, Quality of Service ("QoS") information, etc.), service settings, subscription settings, user preference information, and/or user-configured settings (e.g., user-configured voice call forwarding settings) that may be used in providing of one or more services over a communications network and/or directing performance of one or more profile-settings dependent operations.

A communications network may include any network configured to provide one or more communications services to one or more user devices configured to access the network. In certain embodiments, a communications network includes a wireless communications network such as a mobile phone network. A communications network may additionally or alternatively include, without limitation, a platform or architecture specific communications network such as an LTE based wireless communications network, a CDMA based wireless communications network, and a GSM based wireless communications network. Other embodiments may include other suitable types of communications networks that include network-specific repositories of profile data.

Interface facility 102 may employ any technologies suitable for providing an interface that facilitates communicating or otherwise interfacing with a profile data repository. For example, interface facility 102 may employ one or more application program interfaces, signaling protocols, and/or other interfacing technologies to communicate with a profile data repository, including in any of the ways and/or using any of the configurations described herein. Interface facility 102 may be configured to support local and/or remote communications with a profile data repository. Accordingly, interface facility 102 may interface with multiple profile repositories in distinct communications networks.

Synchronization facility 104 may be configured to synchronize profile data across discrete profile repositories of different communications networks. For example, synchronization facility 104 may synchronize profile data across separate profiles associated with a single user device, such as a first profile associated with the user device and that is maintained by a first profile repository of a first communications network and a second profile associated with the user device and that is maintained by a second profile repository of a second communications network.

Synchronization facility 104 may be configured synchronize profile data across profile repositories of different communications networks in any suitable way, including in any of the ways described here. Examples of synchronizing profile data across profile repositories of different communications networks are described further below.

Storage facility 106 may be configured to maintain profile data 108 for use in synchronizing locally maintained profile data across discrete profile repositories associated with different communications networks. To this end, profile data 108 may be generated and/or utilized by synchronization facility 104 in any of the ways described herein to synchronize local profile data across profile repositories.

Profile data 108 may include copies of profile data stored locally in a profile repository. As described in more detail further below, in certain embodiments, profile data 108 may include data representative of detected differences between local profile data maintained by distinct profile repositories of different communications networks. Such difference in the local profile data may be referred to as "delta data." As is also described in more detail further below, in certain embodiments, profile data 108 may include a master copy of local profile data that may be considered to be authoritative when synchronizing local profile data across profile repositories. It will be recognized that storage facility 106 may maintain additional or alternative data as may serve a particular application.

System 100, including facilities 102-106, may include any computer hardware and/or computer-implemented instructions (e.g., software), or combinations of computer-implemented instructions and hardware, configured to perform one or more of the processes described herein. In particular, system 100 may be implemented on one physical computing device or may be implemented on more than one physical computing device. Accordingly, system 100 may include any number of computing devices (e.g., network devices), and may employ any of a number of computer operating systems. Moreover, it will be recognized that although facilities 102-106 are shown to be separate facilities in FIG. 1, any of those facilities may be combined into a single facility as may serve a particular application.

Accordingly, one or more of the processes described herein may be implemented at least in part as instructions executable by one or more computing devices. In general, a processor (e.g., a microprocessor) receives instructions, from a computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, a DVD, any other optical medium, a RAM, a PROM, an EPROM, a FLASH-EEPROM, any other memory chip or cartridge, or any other medium from which a computer can read.

Figure 2:
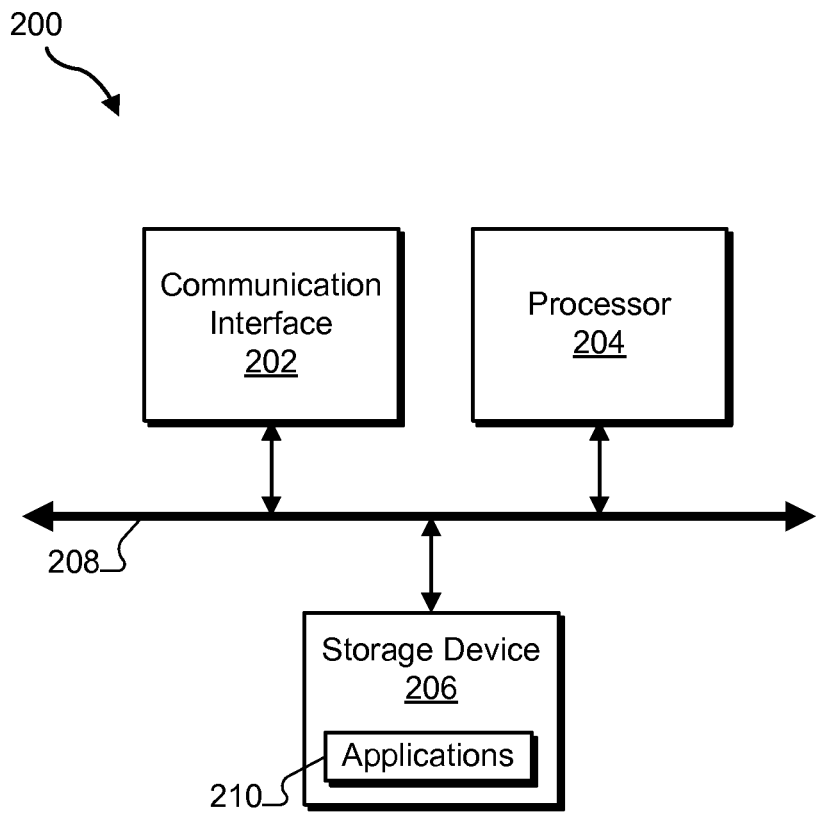
FIG. 2 illustrates an exemplary computing device implementing the system of FIG. 1.

FIG. 2 illustrates an exemplary computing device 200 in which system 100 may be implemented. As shown, computing device 200 may include a communication interface 202, a processor 204, and a storage device 206 communicatively coupled one to another via a communication infrastructure 208. The components of computing device 200 may communicate with one another, including sending data to and receiving data from one another, using any suitable communication technologies. Moreover, the components of computing device 200 may be implemented on any computing device or combination of computing devices, such as one or more servers, personal computers, network devices, telecommunications devices, or the like.

While an exemplary computing device 200 is shown in FIG. 2, the components illustrated in FIG. 2 are not intended to be limiting. Additional or alternative components may be used in other embodiments. Components of the computing device 200 shown in FIG. 2 will now be described in additional detail.

Communication interface 202 may be configured to communicate with one or more computing devices, including one or more computing devices (e.g., network devices) maintaining one or more profile repositories. Examples of communication interface 202 may include, without limitation, a wired network interface (such as a network interface card), a wireless network interface (such as a wireless network interface card), a modem, and any other suitable interface. Communication interface 202 may be configured to utilize any suitable communication media, protocols, formats, and/or technologies to provide an interface for communicating with profile repositories of different communications networks.

Processor 204 generally represents any type or form of processing unit capable of processing data or interpreting, executing, and/or directing execution of one or more of the instructions, processes, and/or operations described herein. Processor 204 may direct execution of operations in accordance with one or more applications 210 or other computer-executable instructions such as may be stored in storage device 206 or another computer-readable medium. As an example, processor 204 may be configured to process data, including modulating, encoding, and/or otherwise preparing data and/or communication signals for transmission by communication interface 202.

Storage device 206 may include one or more data storage media, devices, or configurations and may employ any type, form, and combination of data storage media and/or device. For example, storage device 206 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 206. For example, data representative of one or more executable applications 210 configured to direct processor 204 to perform one or more of the operations described herein may be stored within storage device 206. In some examples, data may be arranged in one or more databases residing within storage device 206.

In some examples, interface facility 102, synchronization facility 104, and/or storage facility 106 may be implemented by or within one or more components of computing device 200. For example, one or more applications 210 residing within storage device 206 may be configured to direct processor 204 to perform one or more processes or functions associated with interface facility 102 and/or synchronization facility 104. Likewise, storage facility 106 may be implemented by or within storage device 206. For example, profile data 108 may be stored within storage device 206.

Figure 3:
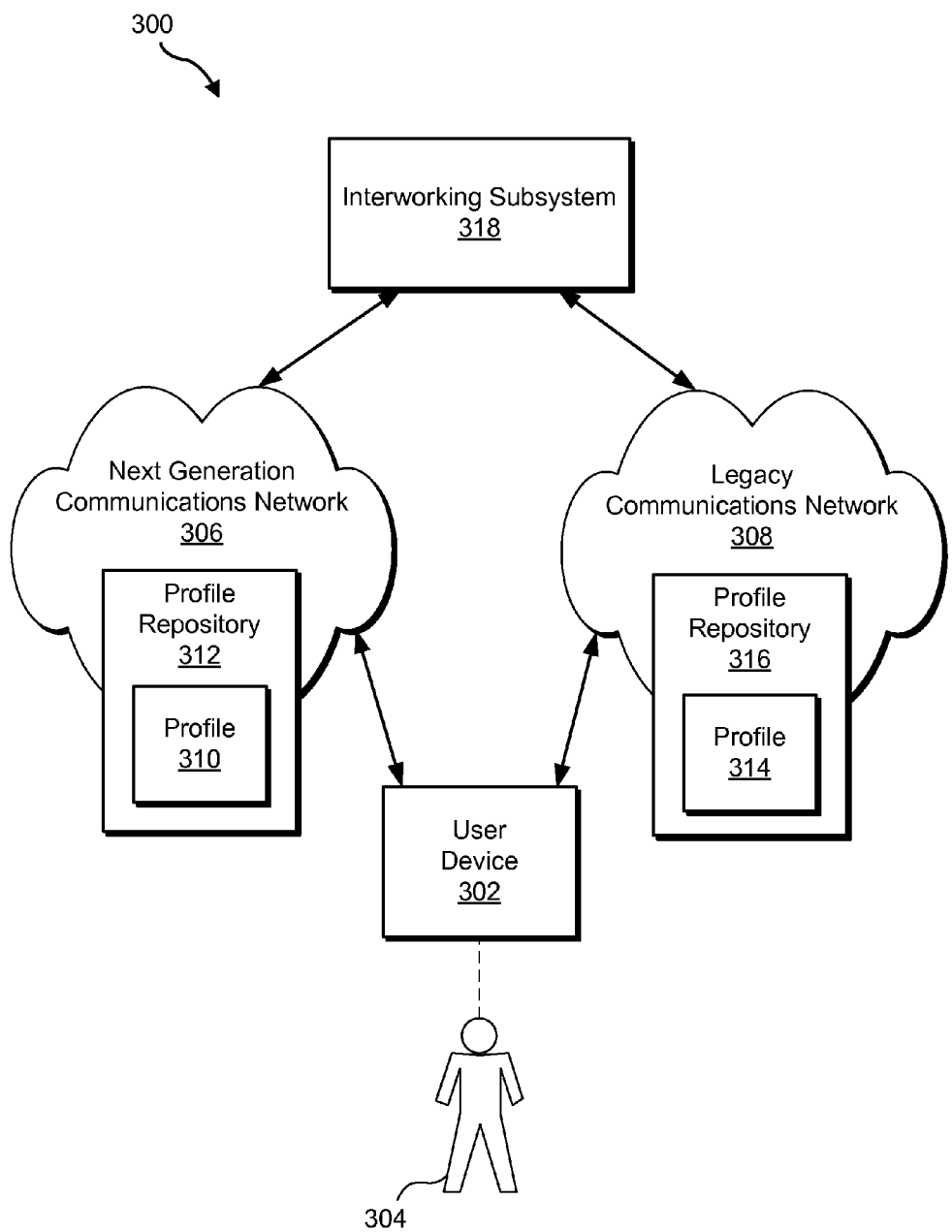
FIG. 3 illustrates an exemplary communications network system implementing the interworking system of FIG. 1.

FIG. 3 illustrates an exemplary communications network system 300 implementing one or more components of system 100 of FIG. 1. As shown in FIG. 3, communications networking system 300 (or simply "system 300") may include a user device 302 associated with a user 304 and configured to access a next generation communications network 306 and an alternate network such as a legacy communications network 308 by communicating with one or more network devices of next generation communications network 306 and legacy communications network 308 to access one or more services provided over the next generation communications network 306 and/or the legacy communications network 308.

User device 302 may include or be implemented by any computing device configured to access next generation communications network 306 and legacy communications network 308 and/or one or more services or applications provided over next generation communications network 306 and/or legacy communications network 308. Examples of user device 302 may include, but are not limited to, a wireless communications device, a mobile communications device (e.g., a mobile phone device and/or an aircard), a personal digital assistant, a computer (e.g., a laptop computer), and a vehicular communication device. In certain embodiments, for example, a user device 302 may include a mobile phone device (e.g., a smart-phone device, cellular phone device, etc.) configured to access one or more services (e.g., voice, text messaging, e-mail messaging, data, and video communications services) via next generation communications network 306 and/or legacy communications network 308. User 304 may be an end user such as a subscriber to one or more services provided over next generation communications network 306 and/or legacy communications network 308, and user device 302 may include an end-user device that may be utilized by user 304 to access the services via next generation communications network 306 and/or legacy communications network 308.

In some examples, user device 302 may register with next generation communications network 306 and/or legacy communications network 308 in order to access services provided over next generation communications network 306 and/or legacy communications network 308. Accordingly, user device 302 may be authenticated and allowed to register to access services via next generation communications network 306 and/or legacy communications network 308. When user device 302 registers with next generation communications network 306 or legacy communications network 308, a profile associated with the user device 302 and maintained within the respective network may be made available to user device 302 and/or used to control access to services, service features, service functions, and/or performance of one or more operations related to the services. For example, upon registration with next generation communications network 306, user device 302 may request and receive a profile 310 maintained by a profile repository 312 of next generation communications network 306. Profile 310 may be used to control one or more operations of user device 302 related to user device 302 accessing one or more services via next generation communications network 306 and/or performing one or more operations related to the services. Similarly, upon registration with legacy communications network 308, user device 302 may request and receive a profile 314 maintained by a profile repository 316 of legacy communications network 308. Profile 314 may be used to control one or more operations of user device 302 related to user device 302 accessing one or more services via legacy communications network 308 and/or performing one or more operations related to the services.

As mentioned, conventionally profiles 310 and 314 may be discrete, separate, and independent of one another, and profile repositories 312 and 316 maintaining profiles 310 and 314, respectively, may be discrete, separate, and independent of one another. However, this may cause one or more profile-dependent operations performed by user device 302 and/or services accessed by user device 302 to undesirably differ from next generation communications network 306 to legacy communications network 308. For example, a service may be accessible by user device 302 via next generation communications network 306 or legacy communications network 308. Conventionally, however, settings for the service may differ from profile 310 to profile 314. Accordingly, the service may function differently depending on whether user device 302 accesses the service via next generation communications network 306 or legacy communications network 308. This may be inconvenient, confusing, and/or unacceptable to user 304.

With the exemplary systems and methods described herein, however, profile data may be synchronized across profiles 310 and 314 such that a service that is dependent on profile data may function uniformly whether user device 302 accesses the service via next generation communications network 306 or legacy communications network 308.

To this end, system 300 may include an interworking subsystem 318 configured to interface with and to synchronize profile data across profile repositories 312 and 316. In certain embodiments, interworking subsystem 318 may include or be implemented by one or more computing devices configured to communicate with one or more network devices of next generation communications network 306 and legacy communications network 308, including network devices on which profile repositories 312 and 316 are implemented. Any suitable communications technologies may be employed by interworking subsystem 318 to interface with profile repositories 312 and 316. Although interworking subsystem 318 is depicted to be outside of next generation communications network 306 and legacy communications network 308 in FIG. 3, in certain other embodiments, interworking subsystem 318 may be integrated with one or more network devices of next generation communications network 306 and/or legacy communications network 308.

Interworking subsystem 318 may include or be implemented by one or more of facilities 102-106 shown in FIG. 1. Accordingly, interworking subsystem 318 may be configured to interface with profile repositories 312 and 316 and to synchronize profile data across profile repositories 312 and 316 in any of the ways described herein.

Examples of synchronizing profile data across profiles 310 and 312 associated with user device 302 will now be described. The examples are illustrative only. One or more of the synchronization operations described herein may be applied in other embodiments, without or without modification, to synchronize profile data across one or more profile repositories of different communications networks.

In certain embodiments, interworking subsystem 318 may be configured to synchronize profile data by obtaining profile data from profile repositories 312 and 316, comparing the profile data obtained from profile repository 316 with profiled data obtained from profile repository 312 to identify any discrepancies ("deltas"), and providing data representative of the identified discrepancies to profile repositories 312 and/or 316 for updating of locally maintained profile data. Interworking subsystem 318 may obtain profile data from profile repositories 312 and 316 in any suitable way. As an example, interworking subsystem 318 may be configured to request and receive profile data from profile repositories 312 and 316 periodically or in response to an occurrence of a predetermined event. For instance, interworking subsystem 318 may request and receive profile data in response to a detected registration of user device 302 with next generation communications network 306 or legacy communications network 308 and/or in response to a detected update to profile data maintained by profile repository 312 or 316. A comparison of profile data may be performed in any way suitable for identifying discrepancies across discrete instances of profile data.

To illustrate, interworking subsystem 318 may request and receive data representative of profile 310 from profile repository 312 and data representative of profile 314 from profile repository 316. Interworking subsystem 318 may then compare the profiles 310 and 314 and identify any discrepancies therein. If discrepancies are identified, profiles 310 and 314 are not in a synchronized state. Interworking subsystem 318 may store data representative of the identified discrepancies in profile data 108. Interworking subsystem 318 may provide data representative of one or more of the discrepancies to profile repository 312 and/or profile repository 316 for use in updating profile 310 and/or profile 314 to attain synchronization of profile data across profiles 310 and 314.

In certain embodiments, interworking subsystem 318 may be configured to generate and maintain a separate master copy of profile data in profile data 108. The master copy may be utilized to update profile data locally maintained by profile repositories 312 and 316. The master copy may be generated in any suitable way, such as by initially generating the master copy based on profile data maintained by profile repositories 312 and/or 316 and subsequently updating the master copy based on updates to the profile data maintained by profile repositories 312 and/or 316. Also, the master copy may be provisioned by a subscriber provisioning system of the network operator, based on a price plan, features, and/or services selected by user 304. Profile data included in the master copy may be provided by interworking subsystem 318 to profile repositories 312 and/or 316 for use in updating locally maintained profile data.

To illustrate, a master copy of profile 310 may be initially generated and stored by interworking facility 318. Profile data in the master copy may be provided by interworking subsystem 318 to profile repository 316 for use in updating profile 314 such that profile data in profile 314 is synchronized with profile data in profile 310. Subsequently, when an update has been made to profile 310 in profile repository 312, interworking subsystem 318 may receive data representative of the update and update the master copy accordingly. A copy of data stored in the master copy may then be provided to profile repository 316, which may update profile 314 in accordance with the data received from interworking subsystem 318.

In certain embodiments, one or more sets and/or subsets of profile data may be defined to be "authoritative" for purposes of synchronizing profile data across profile repositories 312 and 316. Profile data may be assigned an authoritative status such that the profile data marked "authoritative" controls when synchronizing profile data across profile repositories 312 and 316.

Figure 4:
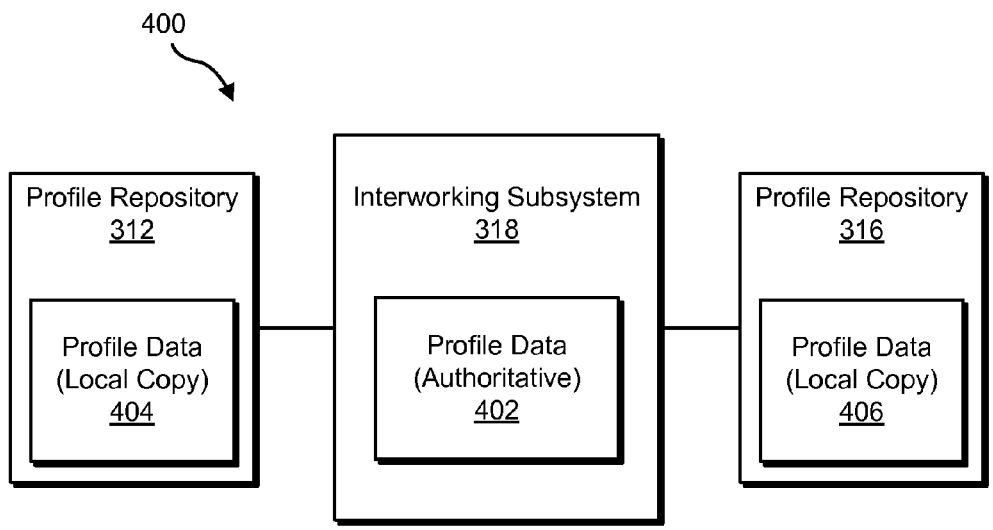
FIG. 4 illustrates an exemplary profile repository interworking configuration.

As an example, in certain embodiments, a master copy of profile data maintained by interworking subsystem 318 may be defined as authoritative. Accordingly, the master copy controls when synchronizing profile data across profile repositories 312 and 316. FIG. 4 illustrates an exemplary profile repository interworking configuration 400 in which profile data 402 (e.g., a master copy of profile data) maintained by interworking subsystem 318 is marked as authoritative and profile data 404 and 406 maintained by profile repositories 312 and 316, respectively, are defined as non-authoritative "local copies." In such a configuration, an update to a local copy of profile data such as profile data 404 may be detected by interworking subsystem 318 and applied to a master copy of profile data 402 maintained by interworking subsystem 318. Interworking subsystem 318 may provide data representative of the master copy of profile data 402 to profile repository 312 and/or profile repository 316 for use in updating local copies of profile data 404 and/or 406, respectively. In this manner, the update made to the local copy of profile data 404 is propagated to another local copy of profile data 406.

Figure 5:
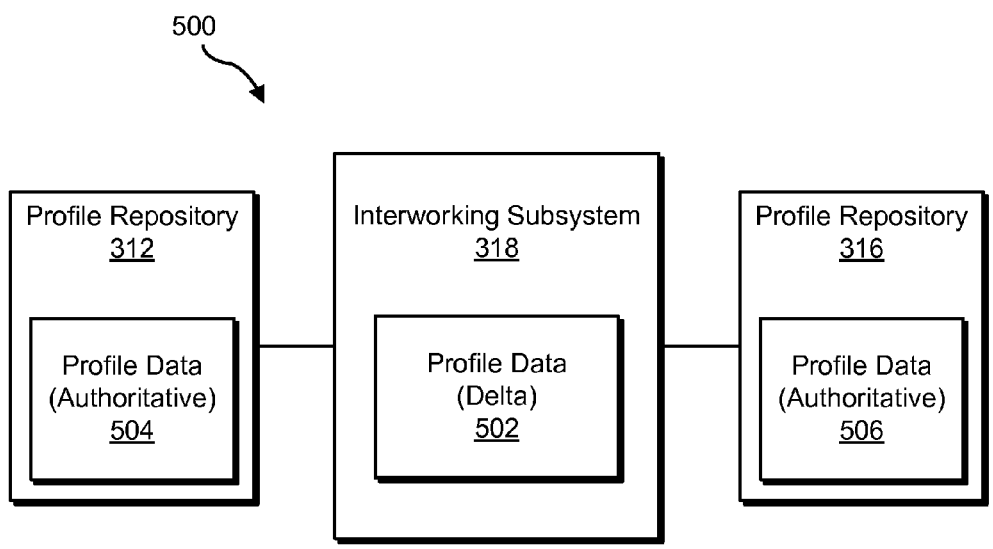
FIG. 5 illustrates another exemplary profile repository interworking configuration.

As another example, in certain embodiments, profile data maintained by profile repositories 312 and 316 may be defined to share "authoritative" status. In such configurations, interworking subsystem 318 may be configured to identify discrepancies between profile data maintained by profile repositories 312 and 316 and propagate the discrepancies to profile repositories 312 and/or 316 for use in updating of the profile data maintained by profile repositories 312 and/or 316. FIG. 5 illustrates an exemplary profile repository interworking configuration 500 in which profile data 502 maintained by interworking subsystem 318 includes delta data and local profile data 504 and 506 maintained by profile repositories 312 and 316, respectively, is defined as "authoritative." One or more conflict resolution rules may be implemented and utilized to solve conflicts between discrete instances of profile data 504 and 506 that share authoritative status. In certain embodiments, for example, shared authoritative status may include dividing authoritative status between profile data 504 and 506 by subscriber and/or service. For instance, profile data 504 may be authoritative for one subscriber and/or service, and provide data 506 may be authoritative for another subscriber and/or service.

As another example, in certain embodiments, profile data maintained by a particular profile repository of a particular communications network may be defined as authoritative. For instance, profile data maintained by profile repository 312 of next generation communications network 306 may be defined as authoritative in some examples. In other examples, profile data maintained by profile repository 316 of legacy communications network 308 may be defined as authoritative.

In certain embodiments, profile data maintained by a profile repository of an "active" communications network may be defined as authoritative. In some examples, a communications network is determined to be an "active" network when a user device is registered with the communications network. For example, returning to FIG. 3, when user device 302 is registered with next generation communications network 306, interworking subsystem 318 may detect the registration status of user device 302 and identify next generation communications network 306 as an "active" network for profile data associated with user device 302. Accordingly, profile 310 maintained by profile repository 312 of next generation communications network 306 may be deemed to be "authoritative" and as such will control when synchronizing profile data across profiles 310 and 314. When user device 302 is registered with legacy communications network 308, interworking subsystem 318 may detect the registration status of user device 302 and identify legacy communications network 308 as an "active" network for profile data associated with user device 302. Accordingly, profile 314 maintained by profile repository 316 of legacy communications network 308 may be deemed to be "authoritative" and as such will control when synchronizing profile data across profiles 310 and 314.

Accordingly, when user device 302 transitions (e.g., roams or falls back) from one communications network to another, interworking subsystem 318 may detect the transition based on registration activities of user device 302 and modify an "authoritative" status of profile data accordingly. For example, when user device 302 roams from next generation communications network 306 to legacy communications network 308, an authoritative status of profile data associated with user device 302 may be reassigned from profile 310 to profile 314. Accordingly, user 304 of user device 302 may update a profile associated with user device 302 within communications network 306 or 308, and interworking subsystem 318 may detect and propagate the update to a separate profile associated with the user device 302 in the other communications network 306 or 308. Hence, an update to profile data may be initiated from any active communications network in which user device 302 is registered and propagated to one or more other communications networks to synchronize profile data associated with user device 302 across different communications networks.

To support active-network-based authority for profile data updates, interworking subsystem 318 may be configured to track which communications network is an active network for user device 302. This may be accomplished in any suitable way such as by requesting and receiving registration and/or location data for user device 302 from one or more communication networks (e.g., from profile repositories 312 and 316 within next generation communications network 306 and legacy communications network 308, respectively). The tracked registration and/or location data of user device 302 may be used by interworking subsystem 318 when synchronizing profile data. In addition, interworking subsystem 318 may utilize the tracked registration and/or location data of user device 302 to monitor for potential fraud, such as a "clone" of user device 302 attempting to access one communications network while user device 302 is registered, located, and/or operating in another communications network. In certain embodiments, interworking subsystem 318 may detect a potentially fraudulent activity and respond by performing one or more remedial actions. For example, interworking facility 318 may be configured to instruct a profile repository and/or other network device to deny registration to a clone device attempting to fraudulently register with a communications network.

In certain embodiments, user device 302 may be able to register with only one communications network at a time, and the profile for the user device 302 maintained by the profile repository of that communications network will be accessed and used to control access to services and/or operations via the communications network. In certain other embodiments, user device 302 may be able to concurrently register with multiple communications networks. For example, user device may register with legacy communications network 308 for certain services (e.g., a voice service and a short message service ("SMS")) and with next generation communications network 306 for certain other services (e.g., a packet data service). For services that can be supported by different networks (e.g., a call forwarding service profile may be shared between two networks), the same service profile may be used for both networks, even though the call forwarding is activated in one of the networks (e.g., a circuit network). When user device 302 registers with the other network (e.g., in an LTE network for VoIP service), the call forwarding feature is activated in the other network (e.g., in the LTE VoIP service). This may be accomplished without user device 302 having to "re-register" for the call-forwarding service in the other network (e.g., in the LTE VoIP network.

When user device 302 is concurrently registered with multiple communications networks, the concept of an "active" network as described above may be parsed into "active" for certain portions of profile data associated with user device 302. For example, profile data may include service-specific portions such as voice profile information (e.g., call forwarding settings) and data profile information (e.g., IP address). For voice profile information within a profile for user device 302, interworking subsystem 318 may treat legacy communications network 308 as "active" and profile data associated with user device 302 maintained by profile repository 316 of legacy communications network 308 as authoritative. Meanwhile, for data profile information within a profile for user device 302, interworking subsystem 318 may treat next generation communications network 306 as "active" and profile data associated with user device 302 maintained by profile repository 312 of next generation communications network 306 as authoritative. In this manner, voice profile information within profile 314 of legacy communications network 308 and data profile information within profile 310 of next generation communications network 306 may be concurrently treated as authoritative for synchronization operations when user device 302 is concurrently registered with legacy communications network 308 for a voice service and with next generation communications network 306 for a data service.

To further illustrate, each of the profiles 310 and 314 shown in FIG. 3 may include a first portion of profile data associated with a voice service that is accessed by user device 302 over next generation communications network 306 and a second portion of profile data associated with a data service that is accessed by user device 302 over legacy communications network 308. The first portion of profile data associated with the voice service and included within profile 314 may be assigned an authoritative status based on legacy communications network 308 being the active network for the voice service. The second portion of profile data associated with the data service and included within profile 310 may be assigned an authoritative status based on next generation communications network 306 being the active network for the data service. In this or a similar manner, data within a profile may be parsed into portions assigned different authoritative statuses based on the communications networks by which services are accessed by user device 302.

In certain embodiments, an authoritative status may be assigned to profile data based on a type of profile data. For example, user-configurable settings within a profile may be selectively assigned or not assigned an authoritative status based on an active network with which user device 302 is registered. Other data within the profile may be selectively assigned or not assigned an authoritative status based on one or more other criteria.

In certain embodiments, interworking subsystem 318 may be configured to selectively synchronize profile data only for certain user devices. For example, interworking subsystem 318 may be configured to determine whether a user device is capable of accessing and/or allowed to access next generation communications network 306. This may be accomplished in any suitable way such as by determining whether a user device has a profile record within interworking subsystem 318 or profile repository 312 of next generation communications network 306 prior to attempting to perform one or more interworking operations for the user device. Such functionality may be useful for conserving network processing and/or bandwidth resources when certain user devices access only legacy communications network 308 and especially when initial deployments of next generation communications network 306 involve small subsets of the user devices that are configured to access legacy communications network 308.

Next generation communications network 306 may include any communications network that utilizes a more advanced communications networking technology, platform, and/or architecture than legacy communications network 308 to provide user device 302 with access to one or more services that are or have been accessible by user device 302 over legacy communications network 308. In certain embodiments, next generation communications network 306 may include a next generation wireless communications network platform and/or architecture such as a next generation mobile phone network platform and/or architecture, and legacy generation communications network 308 may include a legacy wireless communications network platform and/or architecture such as a legacy mobile phone network platform and/or architecture. For example, next generation communications network 306 may include an LTE based wireless communications network, and legacy communications network 308 may include a CDMA or GSM based wireless communications network. In such examples, profile repository 312 of next generation communications network 306 may include an HSS of an LTE based wireless communications network, and profile repository 316 of legacy communications network 308 may include an HLR of a CDMA or GSM based wireless communications network. In certain embodiments, interface facility 102 and synchronization facility 104 may be integrated with the HSS and/or implemented as an add-on to the HSS.

Figure 6:
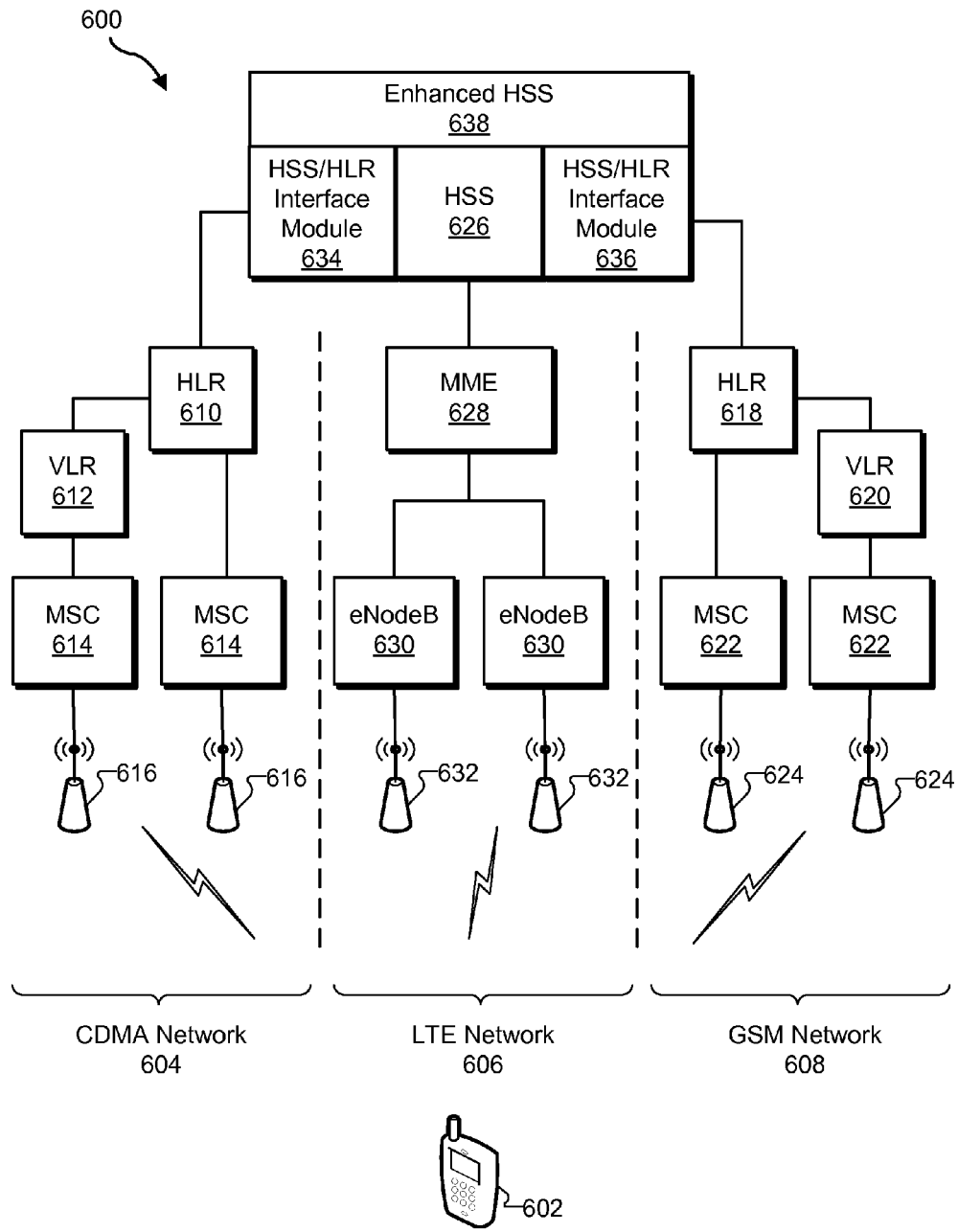
FIG. 6 illustrates another exemplary communications network system implementing the interworking system of FIG. 1.

FIG. 6 illustrates another exemplary communications network system 600 (or simply "system 600") implementing one or more components of system 100 of FIG. 1. As shown in FIG. 6, system 600 may include a user device in the form of a mobile device 602 configured to access a CDMA network 604, an LTE network 606, and a GSM network 608 and/or one or more services provided over CDMA network 604, LTE network 606, and GSM network 608. This is illustrative only. In some examples, mobile device 602 may be configured to access only a subset of CDMA network 604, LTE network 606, and GSM network 608. For example, mobile device 602 may be configured to access only CDMA network 604 and LTE network 606 or only GSM network 608 and LTE network 606.

CDMA network 604, LTE network 606, and GSM network 606 may each include one or more network devices configured to provide one or more services to mobile device 602. As shown in FIG. 6, for example, CDMA network 604 may include a home profile repository in the form of a Home Location Register ("HLR") 610, a visitor profile repository in the form of a Visitor Location Register ("VLR") 612, Mobile Switching Centers ("MSCs") 614, and radio access network equipment 616 (e.g., base stations and/or radio frequency transceivers) interconnected as shown. The devices of CDMA network 604 may provide one or more conventional functions to provide one or more services to mobile device 602. For example, HLR 610 may maintain profile data associated with mobile device 602. When mobile device 602 is registered with CDMA network 604, the profile data maintained by HLR 610 may be used for providing one or more services to mobile device 602.

Similarly, GSM network 608 may include a home profile repository in the form of a Home Location Register ("HLR") 618, a visitor profile repository in the form of a Visitor Location Register ("VLR") 620, Mobile Switching Centers ("MSCs") 622, and radio access network equipment 624 (e.g., base stations and/or radio frequency transceivers) interconnected as shown. The devices of GSM network 608 may provide one or more conventional functions to provide one or more services to mobile device 602. For example, HLR 618 may maintain profile data associated with mobile device 602. When mobile device 602 is registered with GSM network 608, the profile data maintained by HLR 618 may be used for providing one or more services to mobile device 602.

LTE network 606 may include a profile repository in the form of a Home Subscriber Server ("HSS") 626, a Mobility Manager Entity ("MME") 628, eNodeBs 630, and radio access network equipment 632 (e.g., base stations and/or radio frequency transceivers) interconnected as shown. The devices of LTE network 606 may provide one or more LTE based functions to provide one or more services to mobile device 602. For example, HSS 626 may maintain profile data associated with mobile device 602. When mobile device 602 is registered with LTE network 606, the profile data maintained by HSS 626 may be used for providing one or more services to mobile device 602.

In addition, one or more facilities 102-106 of system 100 may be implemented by one or more components of system 600 to support interworking across CDMA network 604, LTE network 606, and GSM network 608, including providing interfaces between and synchronizing profile data across CDMA network 604, LTE network 606, and GSM network 608. The interfacing and the synchronization of profile data across CDMA network 604, LTE network 606, and GSM network 608 may be performed in any of the ways described herein.

In certain embodiments, an interface module may be employed to provide an interface between a pair of networks. As shown in FIG. 6, for example, system 600 may include an HSS/HLR interface module 634 (or simply "interface module 634") configured to provide an interface between LTE network 606 and CDMA network 604. Similarly, system 600 may include an HSS/HLR interface module 636 (or simply "interface module 636") configured to provide an interface between LTE network 606 and GSM network 608. In certain embodiments, interface modules 634 and 636 may be configured to communicate with existing HLR interfaces to support interworking with existing HLRs and to avoid replacing legacy HLRs. For example, interfacing modules 634 and 636 may be configured to appear as "peer" HLRs within a redundancy and/or failover architecture. In other embodiments, new interfaces may be provided for communications between interface modules 634 and 636 and HLRs 610 and 618, respectively. Interface modules 634 and 636 may be configured to process data to conform data to a content, format, and/or protocol expected by HLRs 610 and 618, respectively.

In certain embodiments, interface modules 634 and/or 636 may be integrated together with HSS 626. For example, interface modules 634 and/or 636 and HSS 626 may be integrated within one or more computing devices of LTE network 606. Such integration may be configured during deployment of devices of LTE network 606. Additionally or alternatively, interface modules 634 and/or 636 may be implemented as one or more add-ons to HSS 626 and/or other computing devices of LTE network 606. Such add-ons may be helpful for augmenting already-deployed devices of LTE network 606.

In addition to normal functionality for interfacing with devices within LTE network 606, HSS 626 may be augmented with additional functionality for communicating with interface modules 634 and 636 and/or devices of CDMA network 604 and/or GSM network 608. The additional functionality may be integrated within HSS 626 and/or implemented as an add-on to HSS 626. HSS 626 with such additional functionality may be referred to as an enhanced HSS ("eHSS") 638. Enhanced HSS 638 may be configured to enable interworking across CDMA network 604, LTE network 606, and GSM network 608 such as by providing one or more interfaces between HSS 626 and interface modules 634 and 636, which may in turn interface with devices HLRs 610 and 618 of CDMA network 604 and GSM network 608, respectively. Such interfacing may enable synchronizing of profile data across CDMA network 604, LTE network 606, and GSM network 608 in any of the ways described herein.

Several examples of interworking across LTE network 606 and GSM network 608 will now be described. The examples are illustrative only and not limiting in any sense. The examples may also apply to interworking across LTE network 606 and CDMA network 604, or to interworking across other pairs of communications networks.

In one example, mobile device 602 may register with LTE network 606. In certain embodiments, mobile device 602 may be configured to register with LTE network 606 when LTE network 606 and/or one or more services provided via LTE network are accessible and available to mobile device 602. To register, mobile device 602 may send a registration request, which registration request may trigger an update of profile data associated with mobile device 602 in HSS 626 with appropriate information such as addressing and location information for mobile device 602 based on the registration.

In certain embodiments, one or more services may be provided over LTE network 606 using a service enabler such as IP Multimedia Subsystem ("IMS"). Accordingly, further registration may be performed with an IMS or other service entity, and profile information may include information provided by the IMS, such as presence information, location information, and call handling information.

With mobile device 602 registered with LTE network 606, synchronization of profile data across LTE network 606 and GSM network 608 may be established in any of the ways described herein. For example, in certain embodiments, interface module 636 may send a request to HLR 618 for profile data associated with mobile device 602. Interface module 636 may receive the requested profile data and determine whether the received profile data is current compared to profile data for mobile device 602 that is stored in a master copy in eHSS 638 or in HSS 626. Data comparison may be performed by interface module 636, and any discrepancies relative to the data stored in eHSS 638 or HSS 626 may be identified and sent to HLR 618 for use in updating the profile data maintained by HLR 618 such that profile data is synchronized across HSS 626 and HLR 618. Alternatively, interface module 636 may provide data representative of a current state of profile data for mobile device 602 as maintained in eHSS 638 or HSS 626 to HLR 618 for user by HLR 618 to synchronize profile data for mobile device 602 as maintained by HLR 618 with the profile data maintained in eHSS 638 or HSS 626. A particular process of performing data synchronization may be selected based on a balancing of network bandwidth concerns with processing requirements as may suit a particular implementation.

When mobile device 602 is registered with LTE network 606, call forwarding settings may be set in profile data maintained by HSS 626. For example, a user of mobile device 602 may utilize mobile device 602 to provide a request to set call forwarding settings for mobile device 602. The call forwarding settings may be stored in a profile for mobile device 602 in HSS 626. In addition, one or more of the data synchronization processes described herein may be performed such that interface module 636 may provide data representative of the call forwarding settings to HLR 618 for use in updating a profile for mobile device 602 maintained by HLR 618. Accordingly, HLR 618 may be up to date with synchronized call forwarding settings for mobile device 602 that were initially set in HSS 626 and propagated from HSS 626 to HLR 618.

To continue the example, mobile device 602 may roam outside of a geographic area covered by LTE network 606 and into a geographic area covered by GSM network 608. Mobile device 602 may detect the unavailability of LTE network 606 and may attempt to register with GSM network 608. HLR 618 may receive the registration request. Significantly, because of synchronization of profile data across HSS 626 and HLR 618, HLR 618 already includes current profile data for mobile device 602. In particular, HLR 618 includes the current call forwarding settings for mobile device 602, thus allowing for support of a call forwarding service and/or feature desired by the user of mobile device 602 when mobile device 602 accesses the call forwarding service and/or feature via GSM network 608.

While mobile device 602 is registered with GSM network 608, the user of mobile device 602 may make an alteration to the call forwarding settings (e.g., the user may disable a call forwarding feature). Data representative of the alteration may be provided to HLR 618 and an appropriate change may be made to the profile for mobile device 602 maintained by HLR 618. The update may be propagated to interface module 636 in any of the ways described herein. Interface module 636 may detect and apply the update to the profile for mobile device 602 maintained in HSS 626. To this end, interface module 636 may notify HSS 626 of the profile update, and HSS 626 may update its records accordingly.

Subsequently, mobile device 602 may return to the geographic area covered by LTE network 606, detect the availability of LTE network 606, and attempt to register with LTE network 606. HSS 626 may receive the registration request. Significantly, because of synchronization of profile data across HSS 626 and HLR 618, HSS 626 already includes current profile data for mobile device 602. In particular, HSS 636 includes the current call forwarding settings (e.g., call forwarding feature is disabled) for mobile device 602, thus allowing for support of a call forwarding service and/or feature desired by the user of mobile device 602 independent of the network with which mobile device 602 is registered.

The above-described examples are illustrative only. Other synchronizations of data across discrete profile registers of different communications networks may be similarly performed. For example, profile data synchronization may be similarly performed across HLR 610 of CDMA network 604 and HSS 626 of LTE network 606 or across HLR 610 of CDMA network 604 and HLR 618 of GSM network 608. In addition, profile data synchronizations may be performed as described above whether mobile device 602 initially registers with CDMA network 604, LTE network 606, or GSM network 608.

One or more of the processes, features, and/or operations described above in reference to system 300 of FIG. 3 may also apply to system 600 of FIG. 6. For example, interface modules 634 and 636 may be configured to track an "active" network based on registration of mobile device 602 with CDMA network 604, LTE network 606, or GSM network 608. The tracked "active" network of mobile device 602 may be used for interworking across CDMA network 604, LTE network 606, and GSM network 608 in any of the ways described above, including for determining which data is "authoritative" for data synchronizations. Interface module 634 and/or 636 may be configured to track an "active" network for mobile device 602 in any suitable way, including requesting and receiving registration and/or location information for mobile device from HLR 610, HLR 618, and/or HSS 626. In certain embodiments in which mobile device 602 may concurrently register with more than one of CDMA network 604, LTE network 606, and GSM network 608, the concept of an "active" network for mobile device 602 may be parsed into "active" for certain portions of a profile in any of the ways described above.

Figure 7:
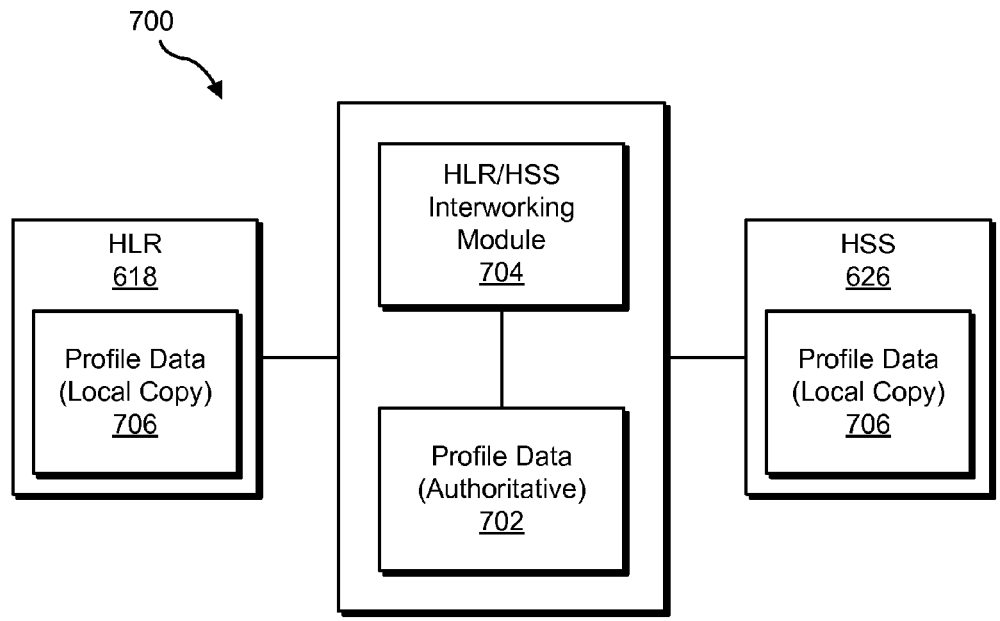
FIG. 7 illustrates an exemplary profile repository interworking configuration.

Enhanced HSS 638 may utilize any of the "authoritative" synchronization data configurations described above. For example, FIG. 7 illustrates an exemplary HSS/HLR interworking configuration 700 in which profile data 702 (e.g., a master copy of profile data) maintained by an HLR/HSS interworking module 704 (or simply "interworking module 704") is defined as authoritative and profile data 706 and 708 maintained by HLR 618 and HSS 626, respectively, are defined as non-authoritative "local copies." In such a configuration, an update to a local copy of profile data 706 may be detected by interworking module 704 and applied to a master copy of profile data 702 maintained by interworking module 704. Interworking module 704 may provide data representative of the master copy of profile data 702 to HLR 618 and/or HSS 626 for use in updating local copies of profile data 706 and/or 708, respectively. In this manner, the update made to the local copy of profile data 706 may be propagated to another local copy of profile data 708.

Figure 8:
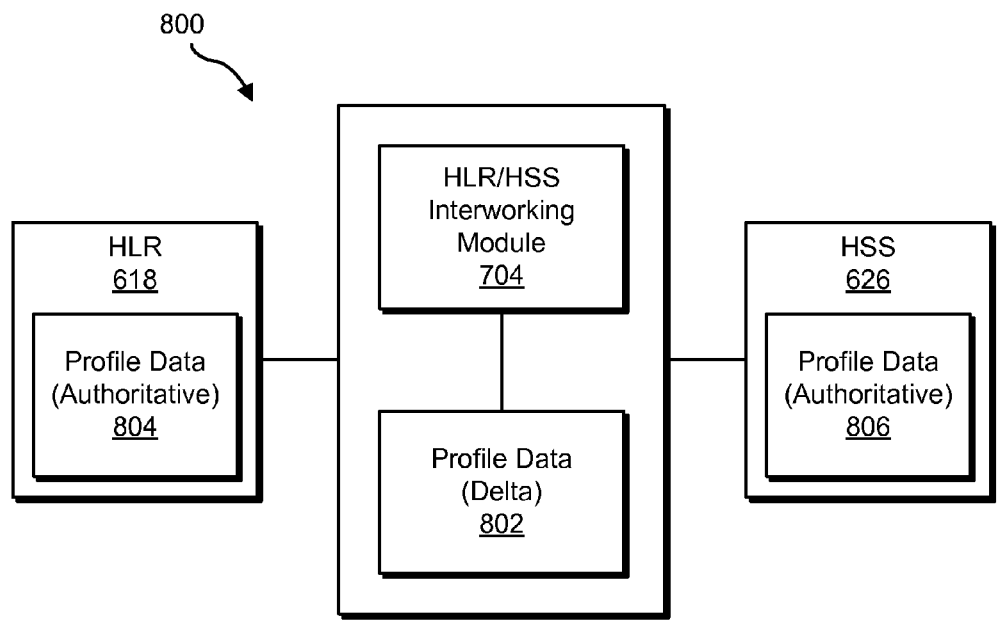
FIG. 8 illustrates another exemplary profile repository interworking configuration.

As another example, in certain embodiments, profile data maintained by HLR 318 and HSS 626 may be defined to share "authoritative" status. In such configurations, interworking module 704 may be configured to identify discrepancies between profile data maintained by HLR 618 and HSS 626 and propagate the discrepancies to HLR 618 and/or HSS 626 for use in updating of the profile data maintained by HLR 618 and/or HSS 626. FIG. 8 illustrates an exemplary HSS/HLR interworking configuration 800 in which profile data 802 maintained by interworking module 704 includes delta data and instances of profile data 804 and 806 maintained by HLR 618 and HSS 626, respectively, are defined as "authoritative." One or more conflict resolution rules may be implemented and utilized to solve conflicts between discrete instances of profile data 804 and 806 that share authoritative status.

Figure 9:
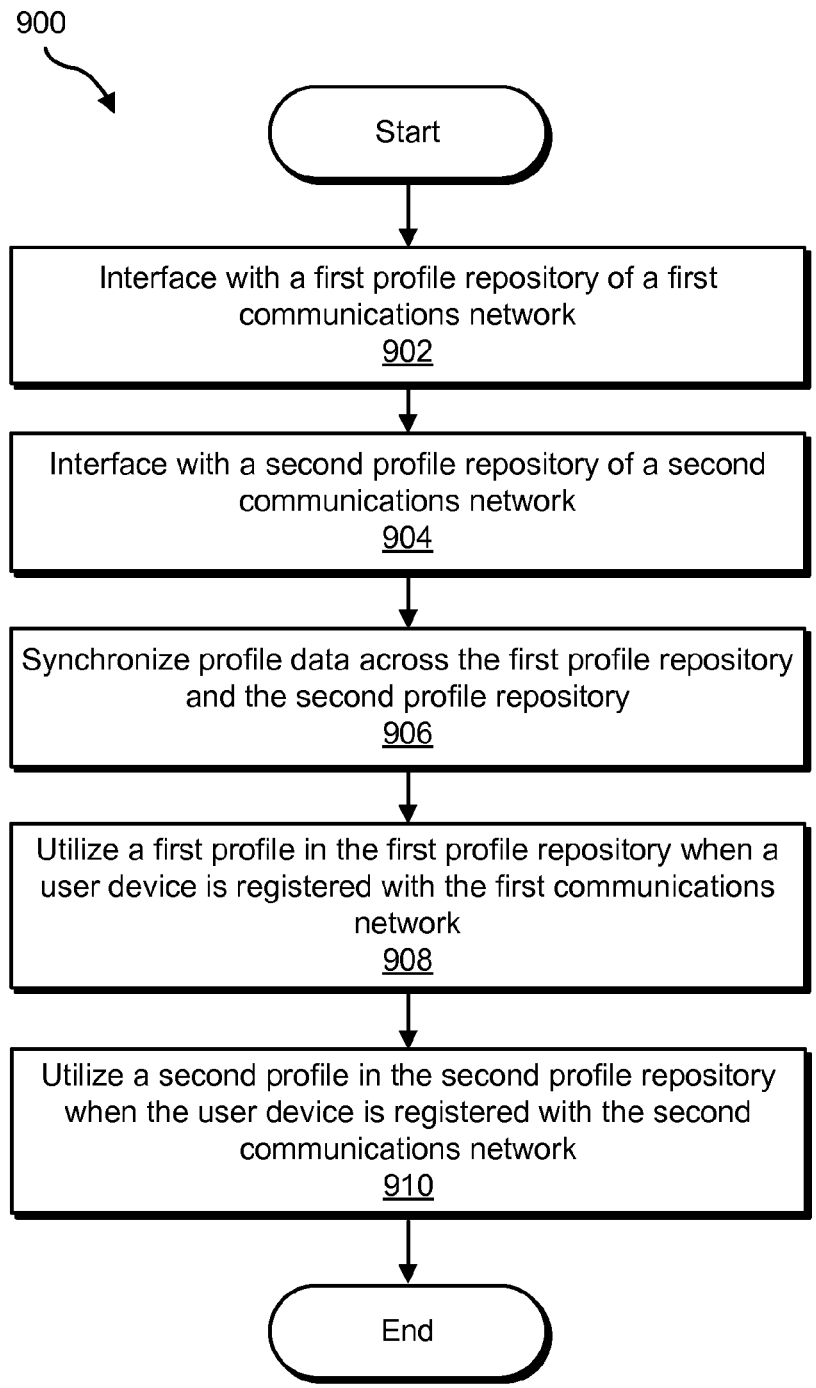
FIG. 9 illustrates an exemplary inter-network profile repository interworking method.

FIG. 9 illustrates an exemplary inter-network profile repository interworking method 900. While FIG. 9 illustrates exemplary steps according to one embodiment, other embodiments may omit, add to, reorder, and/or modify any of the steps shown in FIG. 9. In certain embodiments, one or more of the steps shown in FIG. 9 may be performed by system 100 and/or one or more components of system 300 or system 600.

In step 902, a first profile repository of a first communications network is interfaced with. Step 902 may be performed in any of the ways described above. For example, interworking subsystem 318 may provide one or more interfaces for interfacing with a first profile repository of a first communications network such as profile repository 312 of next generation communications network 306.

In step 904, a second profile repository of a second communications network is interfaced with. Step 904 may be performed in any of the ways described above. For example, interworking subsystem 318 may provide one or more interfaces for interfacing with a second profile repository of a second communications network such as profile repository 316 of legacy communications network 308.

In step 906, profile data is synchronized across the first profile repository and the second profile repository. Step 906 may be performed in any of the ways described above. For example, interworking subsystem 318 may synchronize profile data across the first profile repository and the second profile repository, such as by synchronizing profile data across profile repository 312 and profile repository 316.

In step 908, a first profile in the first profile repository is utilized when a user device is registered with the first communications network. For example, user device 302 may register with next generation communications network 306, and profile 310 maintained in profile repository 312 next generation communications network 306 may be utilized for one or more operations and/or services provided within next generation communications network 306.

In step 910, a second profile in the second profile repository is utilized when the user device is registered with the second communications network. For example, user device 302 may register with legacy communications network 308, and profile 314 within profile repository 316 of legacy communications network 308 may be utilized for one or more operations and/or services provided within legacy communications network 308.

Figure 10:
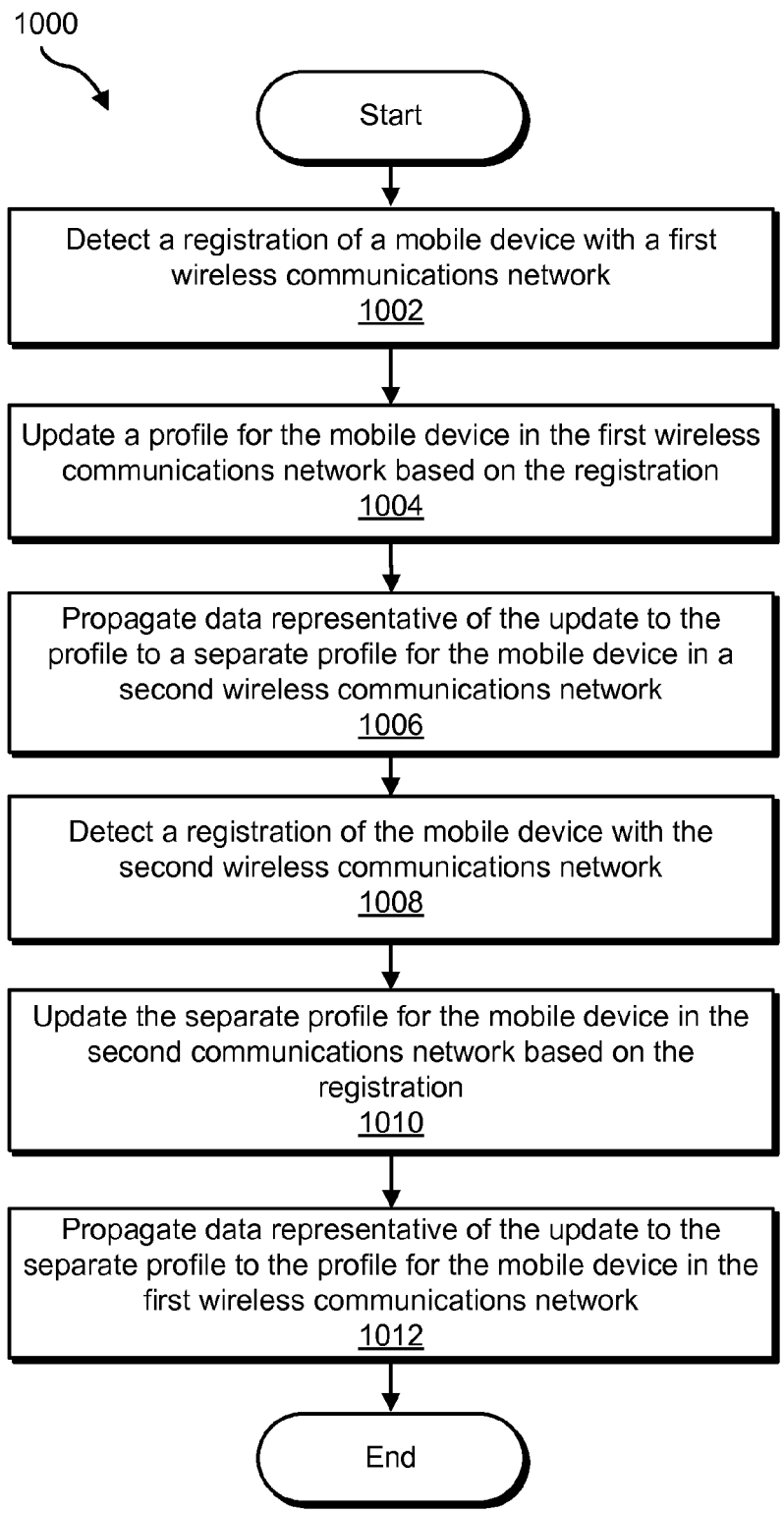
FIG. 10 illustrates another exemplary inter-network profile repository interworking method.

FIG. 10 illustrates another exemplary inter-network profile repository interworking method 1000. While FIG. 10 illustrates exemplary steps according to one embodiment, other embodiments may omit, add to, reorder, and/or modify any of the steps shown in FIG. 10. In certain embodiments, one or more of the steps shown in FIG. 10 may be performed by system 100 and/or one or more components of system 300 or system 600.

In step 1002, a registration of a mobile device with a first wireless communications network is detected. Step 1002 may be performed in any of the ways described above. For example, one or more components of system 600 may detect a registration of mobile device 602 with LTE network 606.

In step 1004, a profile for the mobile device is updated in the first wireless communications network based on the registration. For example, a profile for mobile device 602 may be updated in HSS 626 of LTE network 606 based on registration of mobile device 602 with LTE network 606.

In step 1006, data representative of the update to the profile is propagated to a separate profile for the mobile device in a second wireless communications network. For example, one or more components of system 600 may function in any of the ways described above to propagate data representative of the update to the profile for mobile device 602 maintained in HSS 626 to a separate profile for mobile device 602 maintained in HLR 618 of GSM network 608.

In step 1008, a registration of the mobile device with the second wireless communications network is detected. Step 1008 may be performed in any of the ways described above. For example, one or more components of system 600 may detect a registration of mobile device 602 with GSM network 608.

In step 1010, the separate profile for the mobile device is updated in the second wireless communications network based on the registration of step 1008. For example, the separate profile for mobile device 602 may be updated in HLR 618 of GSM network 608 based on registration of mobile device 602 with GSM network 608.

In step 1012, data representative of the update to the separate profile is propagated to the profile for the mobile device in the first wireless communications network. For example, one or more components of system 600 may function in any of the ways described above to propagate data representative of the update to the separate profile for mobile device 602 maintained in HLR 618 to the profile for mobile device 602 maintained in HSS 626 of LTE network 606.

In this or a similar manner, a mobile device may roam between distinct communications networks, and profile data for the mobile device may be synchronized across separate profiles associated with the mobile device and maintained separately in the distinct communications networks.

Figure 11:
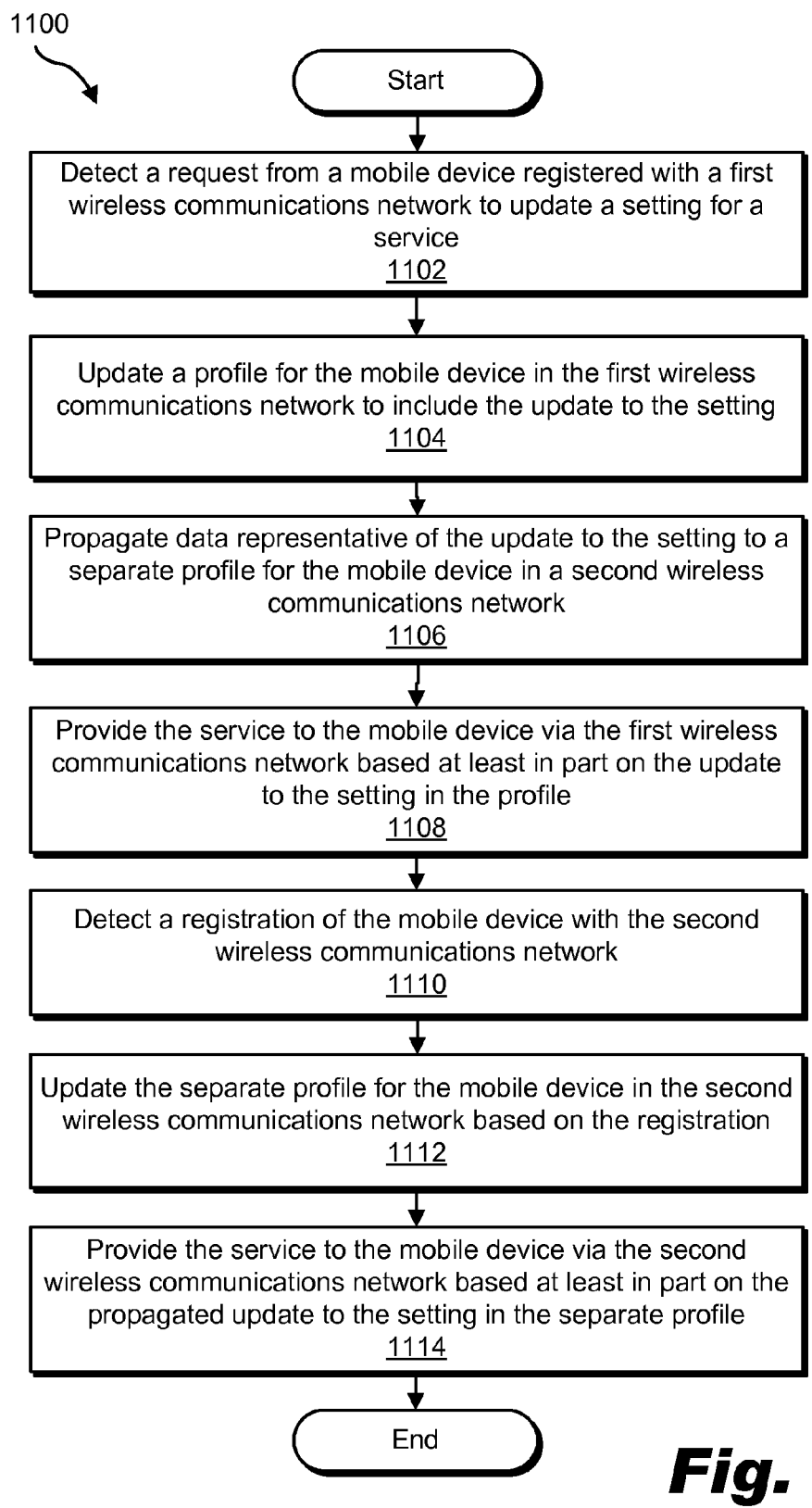
FIG. 11 illustrates another exemplary inter-network profile repository interworking method.

FIG. 11 illustrates another exemplary inter-network profile repository interworking method 1100. While FIG. 11 illustrates exemplary steps according to one embodiment, other embodiments may omit, add to, reorder, and/or modify any of the steps shown in FIG. 11. In certain embodiments, one or more of the steps shown in FIG. 11 may be performed by system 100 and/or one or more components of system 300 or system 600.

In step 1102, a request from a mobile device registered with a first wireless communications network to update a setting for a service (e.g., a call forwarding setting for a call forwarding service) is detected. For example, one or more components of system 600 may detect a request from mobile device 602 registered with LTE network 606 to update a setting for a service accessible by mobile device 602 via LTE network 606.

In step 1104, a profile for the mobile device is updated in the first wireless communications network to include the update to the setting. For example, a profile for mobile device 602 that is maintained in HSS 626 may be updated to include the update to the setting.

In step 1106, data representative of the update to the setting is propagated to a separate profile for the mobile device in a second wireless communications network. For example, one or more components of system 600 may propagate data representative of the update to the profile for mobile device 602 in HSS 626 to a separate profile for mobile device 602 that is maintained in HLR 618 in GSM network 606. The propagation may be performed in such a way that the profile for mobile device 602 in LTE network 606 and the separate profile for mobile device 602 in GSM network 608 are synchronized. In other words, the setting for the service is synchronized across the profiles to include the update.

In step 1108, the service is provided to the mobile device via the first wireless communications network based at least in part on the update to the setting in the profile for the mobile device in the first wireless communications network. For example, the service may be provided to mobile device 602 via LTE network 606 based at least in part on the update to the setting in the profile for mobile device 602 that is maintained in HSS 626 of LTE network 606.

In step 1110, a registration of the mobile device with the second wireless communications network is detected. Step 1110 may be performed in any of the ways described above. For example, one or more components of system 600 may detect a registration of mobile device 602 with GSM network 608.

In step 1112, the separate profile for the mobile device is updated in the second wireless communications network based on the registration of step 1112. For example, the separate profile for mobile device 602 may be updated in HLR 618 of GSM network 608 based on registration of mobile device 602 with GSM network 608.

In step 1114, the service is provided to the mobile device via the second wireless communications network based at least in part on the update to the setting in the separate profile for the mobile device in the second wireless communications network. For example, the service may be provided to mobile device 602 via GSM network 608 based at least in part on the update to the setting in the separate profile for mobile device 602 that is maintained in HLR 618 of GSM network 608.

In this or a similar manner, a mobile device may roam between distinct communications networks, and profile data such as settings for services accessible by the mobile device may be synchronized across separate profiles associated with the mobile device and maintained separately in the distinct communications networks such that the mobile device may access the services using the same settings via any of the distinct communications networks.

One or more of the steps shown in FIG. 11 may be repeated to update settings for services, synchronize the settings, and/or access the services based on the synchronized settings via either the first or second wireless communications network.

While certain examples described above have been presented in reference to particular communications networks and/or network technologies, the examples are illustrative only and not limiting in any sense. One or more of the principles described above may be applied for interworking profile repositories of any suitable communications networks and/or network technologies. For example, one or more of the principles described herein may be applied to interwork internetwork profile repositories associated with 3GPP2 based network technologies (e.g., 1x-RTT, 1xEV-DO (Rev.0 and Rev.A), IS-95, CDMA2000, eHRPD, and HRPD), 3GPP based network technologies (e.g., GSM, GPRS, EDGE, UMTS, HSDPA, HSPA+, and LTE), and/or future networks and/or network technologies.

Additionally or alternatively, while certain examples described above have been presented in reference to particular profile repositories such as HSS and HLR based profile repositories, the examples are illustrative only and not limiting in any sense. One or more of the principles described above may be applied for interworking other profile repositories of communications networks. For example, one or more of the principles described herein may be applied to interwork profile data included in an AAA (Authorization, Authentication, and Accounting) profile repository, which may perform HLR-like functions for data services of a communications network such as a CDMA network.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow.

For example, certain features of one embodiment described herein may be combined with or substituted for features of another embodiment described herein. The description and drawings are accordingly to be regarded in an illustrative rather than a restrictive sense.

What is claimed is:

1. A system comprising:
    an interface facility that interfaces with a home subscriber server ("HSS") of a long term evolution ("LTE") communications network and a home location register ("HLR") of an alternate communications network, the HSS and the HLR being separate profile repositories maintaining separate profiles associated with a user device configured to access the LTE communications network and the alternate communications network, wherein
        the separate profiles comprise a first profile maintained in the HSS of the LTE communications network and a second profile maintained in the HLR of the alternate communications network;
        the first profile maintained in the HSS of the LTE communications network includes voice profile information indicating services and settings used to facilitate voice communications to the user device over the LTE communications network and data profile information indicating services and settings used to facilitate data communications to the user device over the LTE communications network; and
        the second profile maintained in the HLR of the alternate communications network includes voice profile information indicating services and settings used to facilitate voice communications to the user device over the alternate communications network and data profile information indicating services and settings used to facilitate data communications to the user device over the alternate communications network; and
    a synchronization facility communicatively coupled to the interface facility and that synchronizes profile data associated with the user device across the separate profiles maintained by the HSS and the HLR, wherein the synchronization facility synchronizes the profile data by:
        assigning a first authoritative status to the data profile information of the first profile;
        assigning a second authoritative status to the voice profile information of the second profile such that the voice profile information of the second profile has the second authoritative status and the data profile information of the first profile has the first authoritative status concurrently;
        obtaining the first profile from the HSS;
        obtaining the second profile from the HLR;
        comparing the first profile and the second profile to identify a first discrepancy between the voice profile information of the first profile and the voice profile information of the second profile and a second discrepancy between the data profile information of the first profile and the data profile information of the second profile;
        providing, based on the voice profile information of the second profile having the second authoritative status, data representative of the first discrepancy to the HSS for use in updating the voice profile information of the first profile to match the voice profile information of the second profile; and
        providing, based on the data profile information of the first profile having the first authoritative status, data representative of the second discrepancy to the HLR for use in updating the data profile information of the second profile to match the data profile information of the first profile.

2. The system of claim 1, wherein the alternate communications network comprises one of a code division multiple access ("CDMA") communications network and a global system for mobile ("GSM") communications network.

3. The system of claim 1, wherein the interface facility and the synchronization facility are at least one of integrated with the HSS and implemented as an add-on to the HSS.

4. The system of claim 1, wherein:
the interface facility tracks active networks with which the user device is registered for voice communications and data communications; and
the synchronization facility assigns the first authoritative status to the data profile information of the first profile and the second authoritative status to the voice profile information of the second profile based on the tracked active networks with which the user device is registered for voice communications and data communications.

5. The system of claim 1, further comprising
an interworking subsystem that tracks at least one of registration data associated with the user device and location data associated with the user device during the synchronizing of the profile data, detects a potentially fraudulent activity, and performs one or more remedial actions.

6. The system of claim 1, wherein the services used to facilitate voice and data communications over the LTE network include a call-forwarding service.

7. The system of claim 1, wherein the synchronization facility further synchronizes Quality of Service ("QoS") profile information across the HSS of the LTE communications network and the HLR of the alternate communications network.

8. The system of claim 1, wherein the interface facility and the synchronization facility are implemented by an interworking system that is separate from and communicatively coupled to the HSS and the HLR.

9. The system of claim 8, wherein the interface facility implemented by the interworking system comprises an interface module configured to appear to the HLR as a peer HLR within a redundancy architecture.

10. A system comprising:
an interface facility that interfaces with a profile repository of a first wireless communications network and with a profile repository of an alternate wireless communications network, the profile repository of the first wireless communications network maintaining a first profile associated with a mobile device configured to access the first wireless communications network and the alternate wireless communications network, and the profile repository of the alternate wireless communications network maintaining a second profile, separate from the first profile, and associated with the mobile device, wherein
the first profile maintained in the profile repository of the first wireless communications network includes voice profile information indicating services and settings used to facilitate voice communications to the mobile device over the first wireless communications network and data profile information indicating services and settings used to facilitate data communications to the mobile device over the first wireless communications network; and
the second profile maintained in the profile repository of the alternate wireless communications network includes voice profile information indicating services and settings used to facilitate voice communications to the mobile device over the alternate wireless communications network and data profile information indicating services and settings used to facilitate data communications to the mobile device over the alternate communications network; and
a synchronization facility that synchronizes profile data associated with the mobile device across the first profile and the second profile, wherein the synchronization facility synchronizes the profile data by:
assigning a first authoritative status to the data profile information of the first profile;
assigning a second authoritative status to the voice profile information of the second profile such that the voice profile information of the second profile has the second authoritative status and the data profile information of the first profile has the first authoritative status concurrently;
obtaining the first profile from the profile repository of the first wireless communications network and the second profile from the profile repository of the alternate wireless communications network;
comparing the first profile and the second profile to identify a first discrepancy between the voice profile information of the first profile and the voice profile information of the second profile and a second discrepancy between the data profile information of the first profile and the data profile information of the second profile;
providing, based on the voice profile information of the second profile having the second authoritative status, data representative of the first discrepancy to the profile repository of the first wireless communication network for use in updating the voice profile information of the first profile to match the voice profile information of the second profile; and
providing, based on the data profile information of the first profile having the first authoritative status, data representative of the second discrepancy to the profile repository of the alternate wireless communications network for use in updating the data profile information of the second profile to match the data profile information of the first profile.

11. The system of claim 10, wherein the mobile device:
concurrently registers for data communications with the first wireless communications network and for voice communications with the alternate wireless communications network;
utilizes the data profile information of the first profile when the mobile device is registered for data communications with the first wireless communications network; and
utilizes the voice profile information of the second profile when the mobile device is registered for voice communications with the alternate wireless communications network.

12. The system of claim 10, wherein:
the first wireless communications network comprises a long term evolution ("LTE") based wireless communications network; and
the alternate wireless communications network comprises one of a code division multiple access ("CDMA") based wireless communications network and a global system for mobile ("GSM") based wireless communications network.

13. The system of claim 12, wherein:
the profile repository of the alternate wireless communications network comprises a home location register ("HLR"); and
the profile repository of the first wireless communications network comprises a home subscriber server ("HSS").

14. The system of claim 13, wherein the interface facility and the synchronization facility are at least one of integrated with the HSS and implemented as an add-on to the HSS.

15. A method comprising:
interfacing, by an interworking system, with a home subscriber server ("HSS") of a long term evolution ("LTE") communications network and a home location register ("HLR") of an alternate communications network, the HSS and the HLR being separate profile repositories maintaining separate profiles associated with a user device configured to access the LTE communications network and the alternate communications network, wherein
the separate profiles comprise a first profile maintained in the HSS of the LTE communications network and a second profile maintained in the HLR of the alternate communications network,
the first profile maintained in the HSS of the LTE communications network includes voice profile information indicating services and settings used to facilitate voice communications to the user device over the LTE communications network and data profile information indicating services and settings used to facilitate data communications to the user device over the LTE communications network, and
the second profile maintained in the HLR of the alternate communications network includes voice profile information indicating services and settings used to facilitate voice communications to the user device over the alternate communications network and data profile information indicating services and settings used to facilitate data communications to the user device over the alternate communications network; and
synchronizing, by the interworking system, profile data associated with the user device across the separate profiles maintained by the HSS and the HLR, wherein the synchronization facility synchronizes the profile data by
assigning a first authoritative status to the data profile information of the first profile,
assigning a second authoritative status to the voice profile information of the second profile such that the voice profile information of the second profile has the second authoritative status and the data profile information of the first profile has the first authoritative status concurrently,
obtaining the first profile from the HSS,
obtaining the second profile from the HLR,
comparing the first profile and the second profile to identify a first discrepancy between the voice profile information of the first profile and the voice profile information of the second profile and a second discrepancy between the data profile information of the first profile and the data profile information of the second profile,
providing, based on the voice profile information of the second profile having the second authoritative status, data representative of the first discrepancy to the HSS for use in updating the voice profile information of the first profile to match the voice profile information of the second profile, and
providing, based on the data profile information of the first profile having the first authoritative status, data representative of the second discrepancy to the HLR for use in updating the data profile information of the second profile to match the data profile information of the first profile.

16. The method of claim 15, wherein the alternate communications network comprises one of a code division multiple access ("CDMA") communications network and a global system for mobile ("GSM") communications network.

17. The method of claim 15, wherein the interworking system is separate from and communicatively coupled to the HSS and the HLR.

18. The method of claim 17, wherein the interworking system comprises an interface module configured to appear to the HLR as a peer HLR within a redundancy architecture.

19. The method of claim 15, further comprising:
tracking, by the interworking system, active networks with which the user device is registered for voice communications and data communications; and
wherein the assigning of the first authoritative status to the data profile information of the first profile and the assigning of the second authoritative status to the voice profile information of the second profile are based on the tracked active networks with which the user device is registered for voice communications and data communications.

20. The method of claim 15, further comprising:
tracking, by the interworking system during the synchronizing of the profile data, registration data associated with the user device and location data associated with the user device;
detecting, by the interworking system based on the registration data and the location data, a potentially fraudulent activity; and
performing, by the interworking system, a remedial action for the potentially fraudulent activity.

21. The method of claim 15, wherein:
the voice profile information of the first profile comprises a call-forwarding service setting for the LTE communications network;
the voice profile information of the second profile comprises a call-forwarding service setting for the alternate communications network;
the providing of the data representative of the first discrepancy to the HSS for use in updating the voice profile information of the first profile to match the voice profile information of the second profile includes providing the call-forwarding service setting for the alternate communications network to the HSS for use in updating the call-forwarding service setting for the LTE communications network to match the call-forwarding service setting for the alternate communications network.

22. The method of claim 15, wherein the synchronization facility further synchronizes Quality of Service ("QoS") profile information across the HSS of the LTE communications network and the HLR of the alternate communications network.

23. The method of claim 15, embodied as computer-executable instructions on at least one non-transitory computer-readable medium.

* * * * *